March 15, 1949.    B. MICHEL    2,464,336
HIGH-FREQUENCY APPARATUS FOR AUTOMATICALLY
REGULATING TEMPERATURE IN TEMPERING OF
MAGNETIZABLE MATERIAL
Filed Aug. 9, 1946

INVENTOR
BERNARD MICHEL

By John B. Brady
attorney

Patented Mar. 15, 1949

2,464,336

UNITED STATES PATENT OFFICE 2,464,336

HIGH-FREQUENCY APPARATUS FOR AUTOMATICALLY REGULATING TEMPERATURE IN TEMPERING OF MAGNETIZABLE MATERIAL

Bernard Michel, Paris, France, assignor to Compagnie Generale de Telegraphie Sans Fil, a corporation of France Application August 9, 1946, Serial No. 689,331
In France September 12, 1942

Section 1, Public Law 690, August 8, 1946
Patent expires September 12, 1962

5 Claims. (Cl. 219—47)

This invention relates to a process for the automatic regulation of electric tempering furnaces supplied with currents of high frequency.

It consists essentially in utilizing the variations of current in the inductor winding of the furnace arising from variations of the permeability and resistivity of the iron due to the internal transformation of the structure of the steel in the course of heating the piece to be treated, in order to automatically regulate the tempering temperature of a bar of steel treated in a continuous manner; the bar to which is imparted a movement of translation is first raised to the tempering temperature in the furnace and then suddenly cooled on leaving the furnace.

Figure 1:
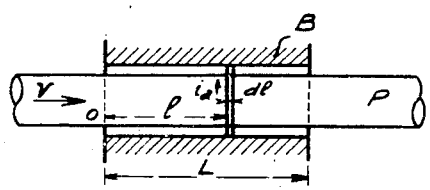
Figure 2:
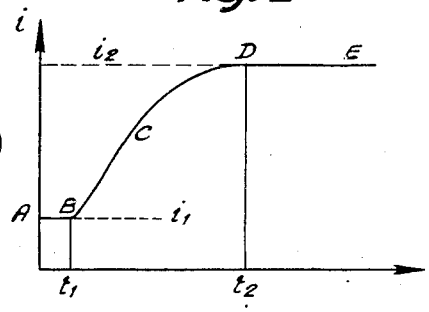
Figure 3:
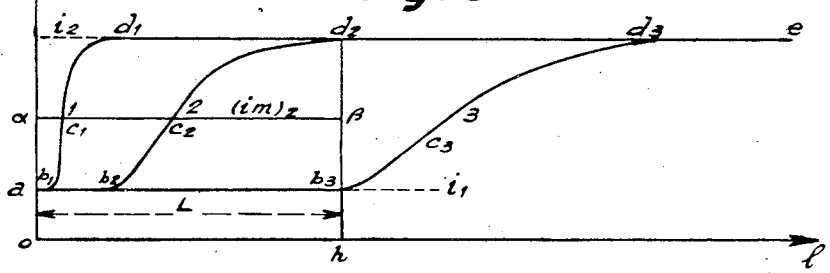
Figure 4:
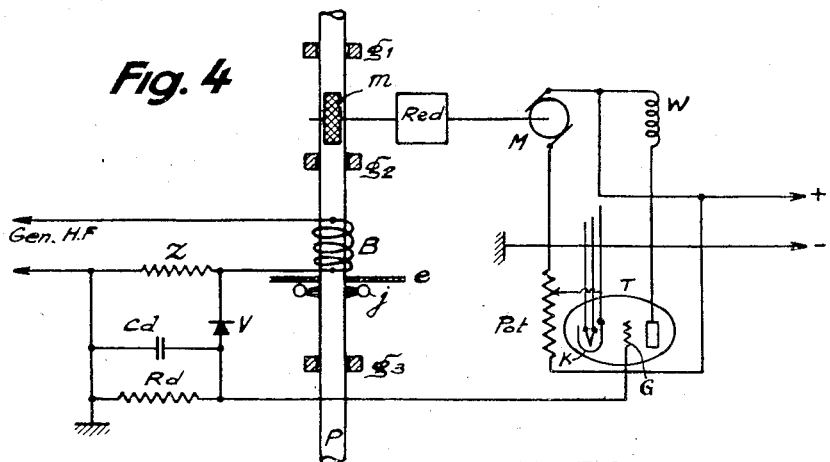

Figure 1 is a schematic view of an inductor winding and the relation thereto of a steel bar to be heat treated; Fig. 2 shows a characteristic curve of the current in the inductor winding plotted with respect to time of heat treatment; Fig. 3 is a characteristic curve showing the change of current through the inductor winding in proportion to the movement of the translation of the steel bar under heat treatment through the furnace; and Fig. 4 diagrammatically shows the circuit for carrying out the method of heat treatment according to my invention.

Figure 1 of the accompanying drawings shows the inductor winding B of a furnace constituted by a single turn of height L. P designates the bar to be treated, moving in the direction of the arrow V. An element of the bar located in the inductor at the distance 1 from the commencement 0 of the turn, is shown at $dl$. It is traversed by the elementary induced current $i_a$ to which there corresponds in the inductor the elementary current $i$. Assuming for simplification that $i_a=0$ for any point of the bar located externally of the inductor and that the bar P is stationary for an instant, the element $dl$ becomes heated and the rate of the current $i$ of the inductor as a function of the time will follow the rate of the curve shown in Fig. 2 wherein:

AB corresponds to the heating of the surface of the element up to the temperature of the Curie point, a point close to the point of transformation;

BCD corresponds to the transformation of the steel and DE corresponds to the heating up of the piece above the point of transformation.

The period of heating corresponding to the tempering temperature is very close to $t_2$, the abscissa of the point D. For further explanation in this connection reference may be made to the specification of the co-pending application No. 620,268 of the 4th of October 1945, filed under the heading "Processes and apparatus for high frequency tempering of steels."

Assume now that the bar has imparted to it a movement of translation in the furnace. According to the hypothesis adopted, the bar reaches 0 cold and is then heated progressively. It must leave the furnace at the end of the period $t_2$, which gives the speed of advance $$\frac{L}{t_2}$$

assuming the movement is uniform. The current $i$ traversing the inductor and relative to the element $dl$ of the bar, varies according to the position of the element $dl$. It passes from the value $i_1$ at the point 0 to the value $i_2$ at the point of abscissa L. Curve 2 of Fig. 3 shows its value as a function of 1.

The total current passing through the inductor is then equal to $$I_2 = \int_0^L i \times dl = (i_m)_2 \times L$$

It is the area $0ab_2c_2d_2h$, which is equivalent to the rectangle $0\alpha\beta h$.

If the speed of advance is less than $$\frac{L}{t_2}$$

there will be obtained for $i$ the rate of the curve I and the total current passing through the inductor will have for its value the area $0ab_1c_1d_1d_2h$, which is slightly less than $i_2L$; that is:

$$I \cong i_2 \times L$$

Similarly, in the case where the speed of advance is too great, $i$ will be represented by the curve 3, and there will be given for the total current passing through the inductor the area $0ab_3h$ or:

$$I_3 = i_1 \times L$$

There will thus be given:

$$I_1 > I_2 > I_3$$

It is this variation of the current circulating in the furnace which is used according to the present invention to regulate the tempering temperature of the bar by automatically regulating the speed of advance of the bar in the furnace.

Fig. 4 represents diagrammatically a form of apparatus for carrying my invention into effect. As shown in Fig. 4, the current I passing through the inductor winding B creates at the terminals of an impedance Z in series with winding B a potential proportional to the current. It is rectified negatively by a rectifier V and collected at the terminals of a resistance Rd shunted across a condenser Cd. The rectified potential is proportional to the amplitude of $I$ and it is applied to the grid G of a valve T which is polarized by the cathode K by means of a potentiometer Pot. The valve T is in series with the field winding W of a shunt motor M. The motor M serves to drive, through the intermediary of a speed reducing gear Red and milled rollers m, the bar P to be treated. The bar P is guided by a series of guides $g_1$, $g_2$, $g_3$, etc. At the exit of the furnace, the bar is thoroughly sprayed by jets $j$ of quenching medium directed onto it from nozzles arranged round it. A screen $e$ can be interposed between the jets $j$ and the exit of the furnace to prevent the jets from penetrating into the furnace. The inductor winding B of the furnace is cooled by water circulation.

The operation of the device is as follows:

It is understood in the first place that the unit above described is regulated, that is to say, that the total polarization of the valve T (polarization by the potentiometer + polarization proportional to $I_2$) is such that the motor M carries the bar P along at the speed necessary for the tempering temperature to be correct, and this with a mean speed of rotation of the motor. The corresponding polarization of the valve T must be close to that necessary for operating in class C.

It is known that a shunt motor has a speed varying inversely with the field current. If now for any reason, such as the power of the furnace diminishing or the speed of the motor increasing, the temperature of the bar on leaving the furnace diminishes, the result will be a reduction of I, with consequent reduction of the degree of polarization of the valve T. The field current of the motor, therefore increases, the motor slows down and the speed of advance of the bar diminishes. The result of this is that the bar is heated more and the reverse phenomenon takes place. Finally, the speed of the motor is automatically regulated in correspondence with the power furnished to the furnace for slight variations thereof and the depth of the tempering thus obtained is regular.

This process of automatic regulation permits obtaining of the regular superficial tempering of cylindrical articles of any shape (bars, permanent way rails, etc.) utilizing a furnace of medium power and tempering successively every part of the piece or article.

The invention is of course susceptible to considerable modification within the scope of the following claims, as regards constructional details, such as the form of the furnace, the means for advancing the piece to be tempered, etc.

What I claim is:

1. Apparatus for automatically regulating temperature in the tempering of progressively movable magnetizable material, comprising an inductor winding having an open core through which magnetizable material is adapted to move, a driving motor, means driven by said motor for imparting translatory movement to said magnetizable material through said open core, a source of high frequency currents, an armature and field circuit for said driving motor, an electron tube including a cathode, control grid, and anode electrodes, a power source for energizing said driving motor, means for energizing said electrodes from said power source, a circuit from said anode through said field circuit to said power source and means for controlling the potential on said grid in proportion to the amplitude of the high frequency current supplied to said inductor winding for correspondingly controlling the operation of said driving motor.

2. Apparatus for automatically regulating temperature in the tempering of progressively movable magnetizable material, comprising an inductor winding having an open core through which magnetizable material is adapted to move, a driving motor, means driven by said motor for imparting translatory movement to said magnetizable material through said open core, a source of high frequency currents, an armature and field circuit for said driving motor, an electron tube including a cathode, control grid, and anode electrodes, a power source for energizing said driving motor, means for energizing said electrodes from said power source, a circuit from said anode through said field circuit to said power source, an impedance connected in series between said source of high frequency currents and said inductor winding, and means for impressing potential differences existent across said impedance upon the control grid of said electron tube for correspondingly controlling the operation of said driving motor.

3. Apparatus for automatically regulating temperature in the tempering of progressively movable magnetizable material, comprising an inductor winding having an open core through which magnetizable material is adapted to move, a driving motor, means driven by said motor for imparting translatory movement to said magnetizable material through said open core, a source of high frequency currents, an armature and field circuit for said driving motor, an electron tube including a cathode, control grid, and anode electrodes, a power source for energizing said driving motor, means for energizing said electrodes from said power source, a circuit from said anode through said field circuit to said power source, an impedance connected in series between said source of high frequency currents and said inductor winding, and a rectifier having its input circuit connected with spaced potential points on said impedance and its output circuit connected with the control grid of said electron tube for correspondingly controlling the operation of said driving motor.

4. Apparatus for automatically regulating temperature in the tempering of progressively movable magnetizable material, comprising an inductor winding having an open core through which magnetizable material is adapted to move, a driving motor, means driven by said motor for imparting translatory movement to said magnetizable material through said open core, a source of high frequency currents, an armature and field circuit for said driving motor, an electron tube including a cathode, control grid, and anode electrodes, a power source for energizing said driving motor, means for energizing said electrodes from said power source, a circuit from said anode through said field circuit to said power source, an impedance connected in series between said source of high frequency current and said inductor winding, a rectifier, a circuit including a condenser shunted by a resistor for interconnecting said rectifier with said impedance and a connection from said rectifier to said control grid for controlling the potential on said control grid in proportion to the amplitude of the high frequency current supplied to said inductor winding for correspondingly controlling the operation of said driving motor.

5. Apparatus for automatically regulating temperature in the tempering of progressively movable magnetizable material, comprising an inductor winding having an open core through which magnetizable material is adapted to move, a driving motor, means driven by said motor for imparting translatory movement to said magnetizable material through said open core, a source of high frequency currents, an armature and field circuit for said driving motor, an electron tube including a cathode, control grid, and anode electrodes, a power source for energizing said driving motor, means for energizing said electrodes from said power source, a circuit from said anode through said field circuit to said power source, an impedance connected in series between said source of high frequency current and said inductor winding, a rectifier, a circuit including a condenser shunted by a resistor for interconnecting said rectifier with said impedance and connections across said resistor to said control grid for controlling the potential on said control grid in proportion to the amplitude of the high frequency current supplied to said inductor winding for correspondingly controlling the operation of said driving motor.

BERNARD MICHEL.

REFERENCES CITED

The following references are of record in the file of this patent:

UNITED STATES PATENTS

| Number | Name | Date |
| --- | --- | --- |
| 1,615,687 | Eschholz | Jan. 25, 1927 |
| 2,041,029 | Stargardter | May 19, 1936 |
| 2,251,277 | Hart et al. | Aug. 5, 1941 |
| 2,293,079 | Ranke | Aug. 18, 1942 |
| 2,391,086 | Crandell | Dec. 18, 1945 |

OTHER REFERENCES

General Electric Review, May 1945, page 15.